T. F. MAY.
NUT LOCK.
APPLICATION FILED APR. 25, 1908.
994,528.
Patented June 6, 1911.
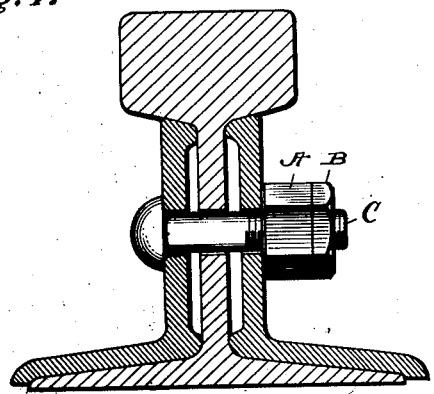
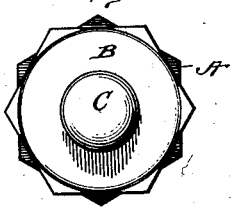
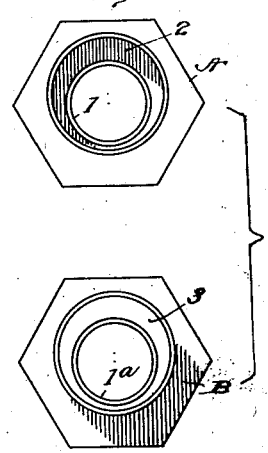
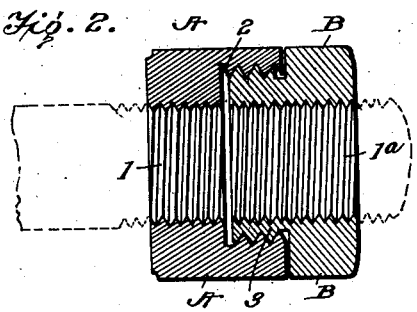
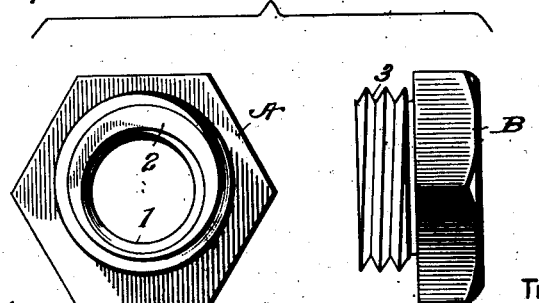
WITNESSES
INVENTOR
Thomas F. May,
BY
ATTORNEYS

UNITED STATES PATENT OFFICE.

THOMAS FOLEY MAY, OF LEHI, UTAH.

NUT-LOCK.

994,528.

Specification of Letters Patent.  Patented June 6, 1911.

Application filed April 25, 1908. Serial No. 429,204.

*To all whom it may concern:*

Be it known that I, THOMAS FOLEY MAY, a citizen of the United States, and a resident of Lehi, in the county of Utah and State of Utah, have invented certain new and useful Improvements in Nut-Locks, of which the following is a specification.

My invention is an improvement in the class of nuts locked by means of a smaller jam nut.

The details of construction, arrangement and combination of parts are as hereinafter described and shown in the accompanying drawing in which—

Figure 1 is a vertical cross section of a railroad rail provided with fish plates secured by a bolt provided with my improved nut-lock. Fig. 2 is a longitudinal section of the bolt nut and jam, or locking nut in the locking position. Fig. 3 includes an inner face view of the bolt nut, and a side view of the jam, or locking nut. Fig. 4 is an end view of the main and lock nuts in the locking position. Fig. 5 includes diagrammatic views of the inner faces of the bolt and lock nuts.

The polygonal or main bolt-nut A has an axial bore 1, which is threaded to the right and in its outer face it is provided with a recess or socket 2, which is threaded in the opposite direction, and which is enlarged and also formed eccentrically with relation to the central bore and the perimeter of the nut.

The jam, or locking, nut B has a central bore 1$^a$, which is threaded to the right, corresponding with the threaded bore of the main or bolt nut A. The said jam nut is constructed with a reduced boss or tenon 3, which is threaded to the left and also formed eccentric with the bore 1$^a$, corresponding in this respect to the threaded socket 2. The jam-nut B is provided with a series of sides corresponding with the bolt nut A. When the jam nut has been screwed into the main or bolt nut A, and the latter is turned home on the bolt C, as shown in Fig. 1, the nut may be locked by turning the jam nut B to the right or left, but preferably to the left, by which operation the eccentric portion of the jam nut effects the desired lock. In other words, the eccentricity of the tenon 3 of the jam nut, and the socket 2 of the bolt nut causes the thread 1$^a$ of the jam nut to be wedged upon or jam with the thread of the bolt. To effect such lock it is only necessary to turn the jam nut a small portion of a revolution, or to the position indicated in Fig. 4, where the sides of the jam nut are shown out of coincidence with those of the bolt nut.

It will be understood that in Fig. 1, the bolt nut A and jam nut B are not in a locking position, and that the jam nut requires to be turned but a fraction of a revolution to the right or left in order to be locked in the said position as indicated in Fig. 4. It is apparent that the locking of the bolt nut A may be easily and quickly effected by limited movement or rotation of the jam nut B, and that the same may also be easily released by simply turning the jam nut B back to the normal position in which its sides correspond with those of the bolt nut, as shown in Fig. 1. Both bolts A, B, may be then screwed on or off together.

The enlarged threads on the boss or tenon of the locking nut cannot of course enable it to work in harmony with threads of the axle bore, and hence a jam results when the parts are screwed up, and at the same time the eccentricity of the boss adds to this jam effect. I thus secure a firmer lock than would be practicable by means of the difference in threads alone or by eccentricity alone.

Both nuts being of the same size and having the same form, one wrench of fixed adjustment serves to screw them both home, or to remove both from the nut. Not only does one wrench serve to put on and take off the nut, but in addition it holds the bores of the main and lock nut in alinement, while both are being put on and removed from the bolt, thus preventing the locked nut from turning so as to bring its axial bore out of alinement with that of the bolt nut. The same adjusted wrench will also serve to set the lock nut.

What I claim is—

In combination, a threaded bolt, a main nut having a threaded bore which fits the bolt, a jam nut having a threaded bore which fits the bolt, and a socket and tenon threaded engagement between the main nut and the jam nut, the threads of which are of opposite incline to those of the bore, the socket and tenon being eccentric to the bolt opening.

THOS. FOLEY MAY.

Witnesses:
 D. W. AMMERMAN,
 J. W. BAIN.